United States Patent
Kim et al.

(10) Patent No.: US 6,912,431 B2
(45) Date of Patent: Jun. 28, 2005

(54) METHOD AND APPARATUS FOR INDICATING STATES OF ELECTRONIC DEVICES

(75) Inventors: Jin-Hwi Kim, Suwon (KR); Jun-Hum Hwang, Suwon (KR); Eun-Jung Kang, Suwon (KR); Dae-Sung Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 09/878,200

(22) Filed: Jun. 12, 2001

(65) Prior Publication Data

US 2002/0054108 A1 May 9, 2002

(30) Foreign Application Priority Data

Jun. 26, 2000 (KR) ........................................ 2000-35296

(51) Int. Cl.[7] .............................. G09G 5/00; H04Q 7/32
(52) U.S. Cl. .............................. 700/83; 700/17; 725/37; 725/88; 725/102; 345/716; 345/949; 345/967; 345/977
(58) Field of Search ...................... 700/83, 17; 725/37, 725/88, 102; 345/168, 169, 716, 863, 864, 865, 549, 967, 970, 977

(56) References Cited

U.S. PATENT DOCUMENTS

| | | | | |
|---|---|---|---|---|
| 4,642,710 A | * | 2/1987 | Murtha et al. | ................. 360/79 |
| 5,870,683 A | * | 2/1999 | Wells et al. | ................. 455/566 |
| 6,239,787 B1 | * | 5/2001 | Sugaya | ........................ 345/169 |

\* cited by examiner

*Primary Examiner*—Emanuel Todd Voeltz
(74) *Attorney, Agent, or Firm*—Staas & Halsey LLP

(57) ABSTRACT

An electronic device operation method and apparatus. A current state of a device such as TVs or VCRs is indicated as a graphic moving picture of a familiar character shape. Pictures containing an associated character shape are stored in correspondence with a various states of the electronic device. The pictures are formed of fonts each of which has a predetermined magnitude and corresponds to a block of the picture. One or more fonts are read during the time of shifting a device state according to a user key input, and the fonts are changed at time intervals to display a moving picture. A sound corresponding to the moving picture may be output together with the displayed moving picture, to further enhance the device state indication. Thus, a current state of the electronic device is more recognized by persons who do not read characters.

8 Claims, 11 Drawing Sheets

FIG. 1 (PRIOR ART)

|    | 00 | 01 | 02 | 03 | 04  | 05 | 06 | 07 | 08 | 09 | 0A | 0B | 0C | 0D | 0E | 0F |
|----|----|----|----|----|-----|----|----|----|----|----|----|----|----|----|----|----|
| 00 | 0  | 1  | 2  | 3  | 4   | 5  | 6  | 7  | 8  | 9  | A  | B  | C  | D  | E  | F  |
| 10 | G  | H  | I  | J  | ... |    |    |    |    |    |    |    |    |    |    |    |
| 20 |    |    |    |    |     |    |    |    |    |    |    |    |    |    |    |    |
| 30 |    |    |    |    |     |    |    |    |    |    |    |    |    |    |    |    |
| 40 |    |    |    |    |     |    |    |    |    |    |    |    |    |    |    |    |
| 50 |    |    |    |    |     |    |    |    |    |    |    |    |    |    |    |    |
| 60 |    |    |    |    |     |    |    |    |    |    |    |    |    |    |    |    |
| 70 |    |    |    |    |     |    |    |    |    |    |    |    |    |    |    |    |
| 80 |    |    |    |    |     |    |    |    |    |    |    |    |    |    |    |    |
| 90 |    |    |    |    |     |    |    |    |    |    |    |    |    |    |    |    |
| A0 |    |    |    |    |     |    |    |    |    |    |    |    |    |    |    |    |
| B0 |    |    |    |    |     |    |    |    |    |    |    |    |    |    |    |    |
| C0 |    |    |    |    |     |    |    |    |    |    |    |    |    |    |    |    |
| D0 |    |    |    |    |     |    |    |    |    |    |    |    |    |    |    |    |
| E0 |    |    |    |    |     |    |    |    |    |    |    |    |    |    |    |    |
| F0 |    |    |    |    |     |    |    |    |    |    |    |    |    |    |    |    |

2PAGE

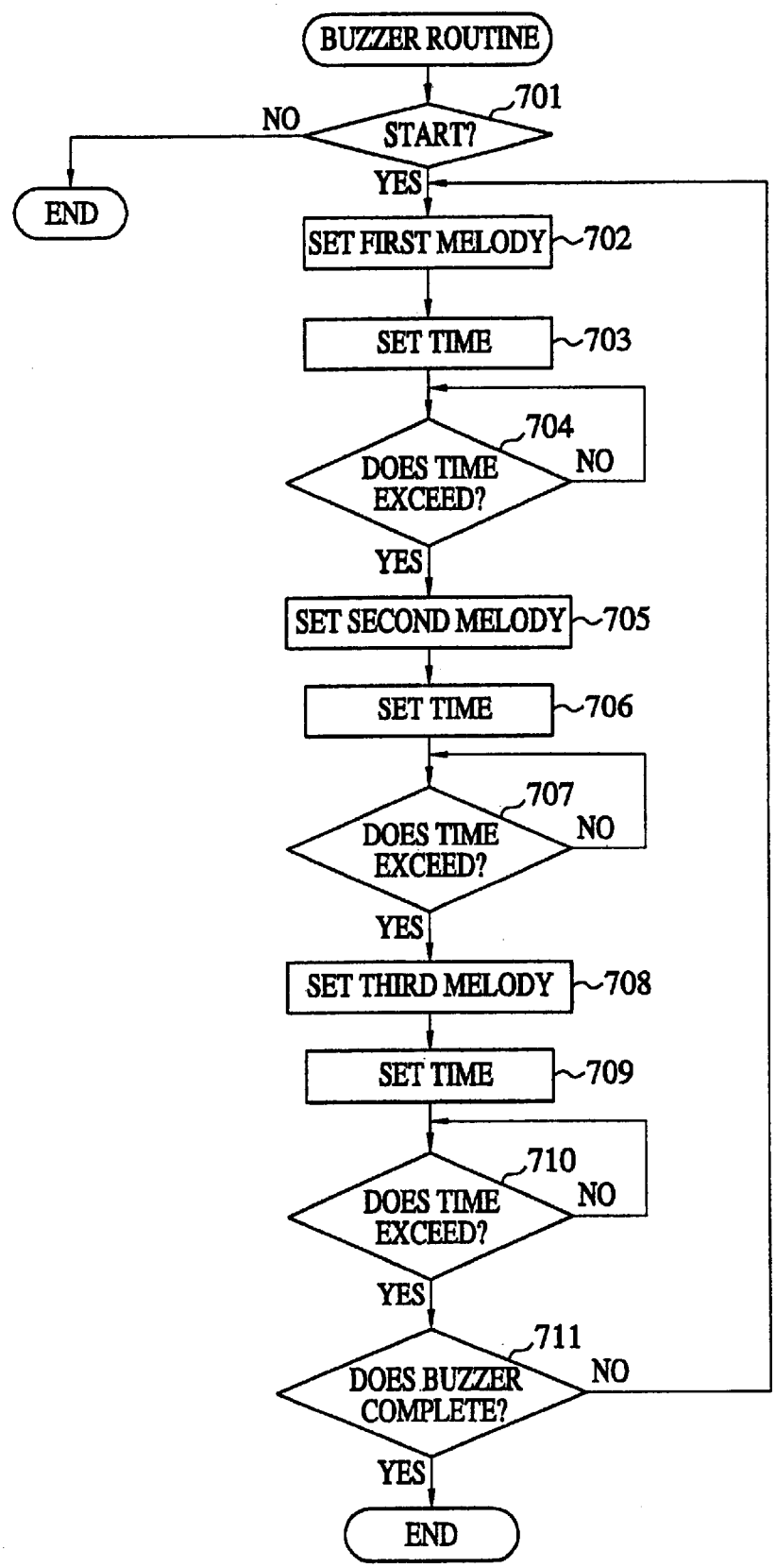

FIG. 8A
 
FIG. 8B
 
FIG. 8C
 
FIG. 8D
 

METHOD AND APPARATUS FOR INDICATING STATES OF ELECTRONIC DEVICES

CROSS-REFERENCE TO RELATED APPLICATIONS

This application claims the benefit of Korean Application No. 2000-35296 filed Jun. 26, 2000, in the Korean Patent Office, the disclosure of which is incorporated herein by reference.

BACKGROUND OF THE INVENTION

1. Field of the Invention

The present invention relates to a method and apparatus for indicating states of electronic devices such as TVs and VCRs, and more particularly, to an operation state of electronic device indication method of and apparatus for making users familiar with the electronic device and allowing the users to see the current state of the electronic device more easily, by indicating operations of characters during a servo control for shifting a state of the electronic device in association with the operation states.

2. Description of the Related Art

Electronic devices such as TVs and VCRs have various operational states. In the case of a VCR, there are various operational states such as power, play, stop, fast forward (FF) and rewind (REW). If a user performs a key manipulation of a desired state through a remote controller or a key matrix attached on an electronic device, a microcomputer receives and judges the key input. The microcomputer reads OSD (on-screen-display) characters corresponding to the judged key input among OSD characters stored in an OSD IC (integrated circuit) and displays the read characters on a TV monitor for a certain time, to thereby allow a user to see the current state of the electronic device. Here, the OSD IC is usually a VRAM, which stores alphanumeric characters as shown in FIG. 1.

FIG. 1 is a view showing a conventional structure of a VRAM for indicating the electronic device state, in which alphanumeric characters are stored in a total of 256 addresses from a "0000" address to an "F00F" address. The stored alphanumeric characters are various characters including, for example, numbers of "0" to "9", alphabetical characters of "A" to "Z" and characters corresponding to other languages, such as for example Korean consonants and vowels, in which one character is assigned to each address.

The microcomputer reads the characters corresponding to the judged operation state among the characters stored in the VRAM of FIG. 1, and displays the read characters on a predetermined position of the display as shown in FIGS. 2A through 2D. The operation state is usually displayed as alphabetical characters. For example, if a user depresses a stop key in order to stop a cassette tape which is being reproduced currently, the microcomputer judges whether there is a key input, and reads corresponding characters from addresses each storing a character of "S," "T," "O" and "P" in the VRAM constructed as shown in FIG. 1. The microcomputer combines the read characters and displays on the upper-left portion of the display a word "STOP" indicating that a current operation state is to stop the tape run as shown in FIG. 2A. The operation states such as fast forward (FF), rewind (REW) and play shown in FIGS. 2B through 2D are displayed as OSD characters on the display through the same procedure.

However, the current operation states are displayed as OSD characters in the existing electronic device, which is monotonous to the user. Also, in the case of children or old persons who do not read characters, the current operation states are not recognized.

SUMMARY OF THE INVENTION

To solve the above problems, it is an object of the present invention to provide an operation state indication method and apparatus for making users familiar with an electronic device and allowing the users to see the current states of the electronic device more easily, by indicating a current state of the electronic device as a graphic moving picture of familiar characters such as, for example, animals.

It is another object of the present invention to provide an operation indication method and apparatus for outputting a sound together with the displayed moving picture character.

Additional objects and advantages of the invention will be set forth in part in the description which follows, and, in part, will be obvious from the description, or may be learned by practice of the invention.

To accomplish the above and other objects of the present invention, there is provided an operation state indication method comprising pre-storing a picture indicating each operation state of an electronic device; receiving a key input and judging an operation state; controlling a servo driving according to the judging of the operation state to shift a current state to the judged state, and generating a control signal during controlling the servo driving to thereby read a picture corresponding to the judged operation state among the pre-stored pictures; and displaying the picture corresponding to the judged operation state on a display.

According to another aspect of the present invention, there is also provided an operation state indication apparatus for indicating various operational states of the control of servo driving, the operation state indication apparatus comprising: a key inputter which selects an operation state based on a user input; a memory which stores a plurality of pictures indicating the various operation states of the control of servo driving in the form of fonts; a microcontroller which judges an operation state from a key input of the key inputter and reads pictures corresponding to the judged operation state from the memory during control of the servo driving in order to shift from a current state to the judged state, to thereby form a picture; and a display which displays the picture formed in the microcontroller thereon.

BRIEF DESCRIPTION OF THE DRAWINGS

The above objects and other advantages of the present invention will become more apparent by describing the embodiments thereof in more detail with reference to the accompanying drawings in which:

FIG. 1 is a view showing a conventional structure of a VRAM for indicating an electronic device state;

FIG. 7 is a flow-chart view for explaining a melody output process corresponding to the displayed moving picture character of the FIG. 3 apparatus; and FIGS. 8A–8H show melody examples corresponding to moving picture character examples to be displayed according to corresponding states of the electronic device.

DESCRIPTION OF THE PREFERRED EMBODIMENTS

Figure 2A:
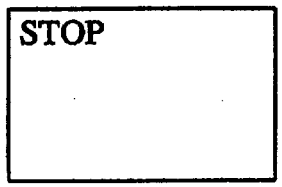
FIGS. 2A through 2D show a display illustrating OSD display examples of device states in a conventional electronic device.
Figure 2B:
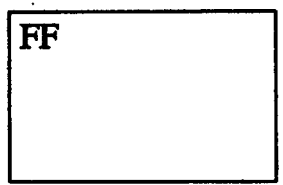
Figure 2C:
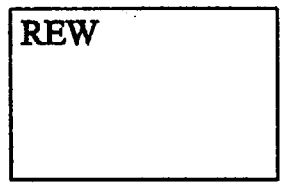
Figure 2D:
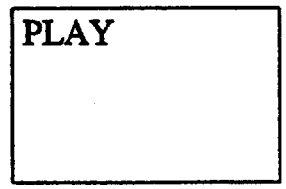

Reference will now be made in detail to the present embodiments of the present invention, examples of which are illustrated in the accompanying drawings, wherein like reference numerals refer to like elements throughout.

Figure 3:
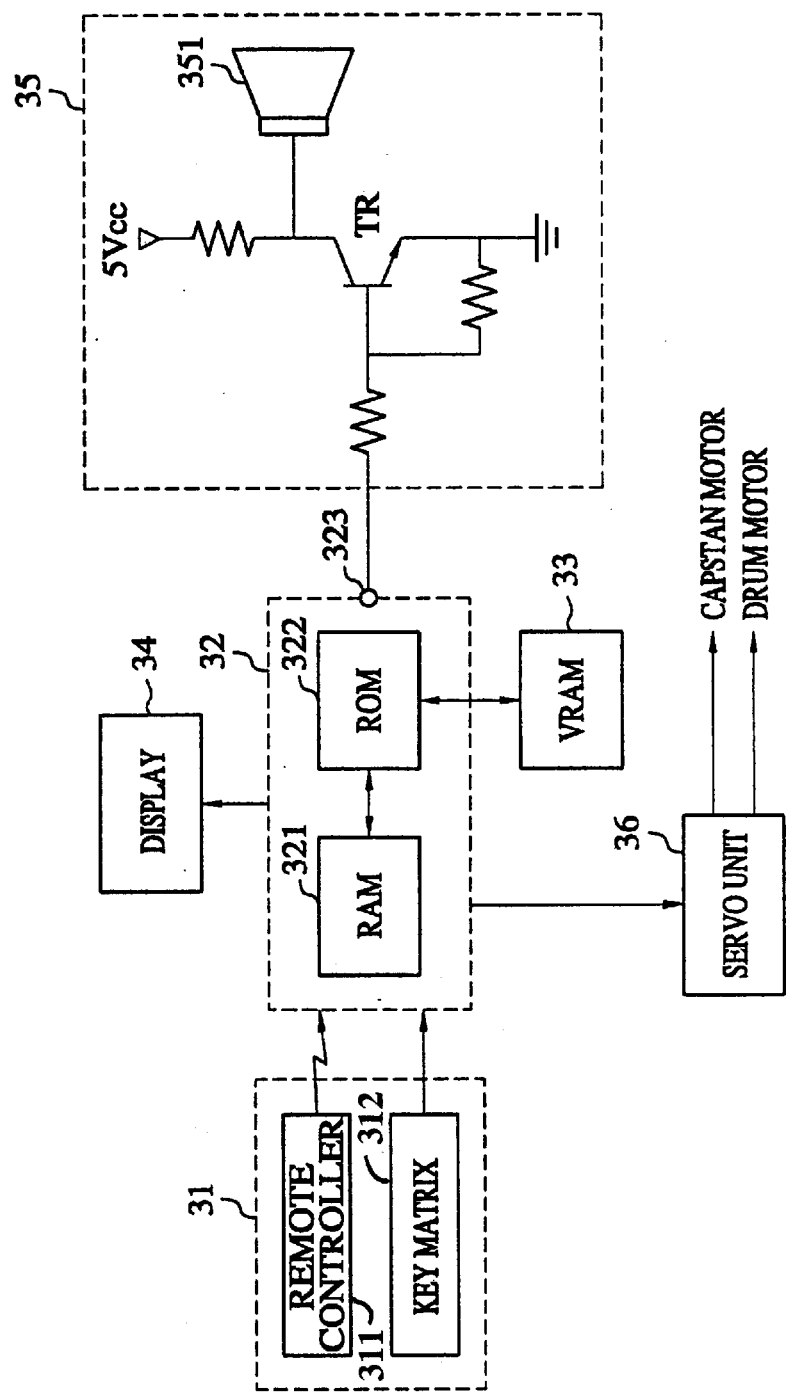
FIG. 3 is a block diagram showing an electronic device state indication apparatus to which the present invention is applied.

FIG. 3 shows a VCR to which an operation state indication apparatus of the present invention is applied. The VCR shown in FIG. 3 comprises a key inputter 31 including a remote controller or a key matrix to key manipulate the VCR, and a VRAM 33 which stores pictures of character shapes in the form of fonts. The VCR of FIG. 3 includes a microcontroller 32 having a ROM 322 which stores programs and a RAM 321 to control the stored programs to operate in sequence. The microcontroller 32 reads fonts corresponding to the operation state according to the key input from the VRAM 33, forms a picture and displays the formed picture on a display 34. The microcontroller 32 controls a servo unit 36 in order to shift a current state of the VCR to the state corresponding to the key input. The servo unit 36 includes a drum servo which controls rotation of video heads and a capstan servo which transfers video tape and maintains a tape speed constant. A capstan motor and a drum motor are driven under control of the servo unit 36. The VCR of FIG. 3 includes a sound generator 35 for generating a predetermined sound according to the displayed picture, in which the sound generator 35 includes a transistor (TR) whose base electrode is connected to a timer port 323 and a buzzer 351 (such as for example a piezoelectric device) connected to the output end from the collector electrode of the transistor (TR). The operation of indicating the operation states of the FIG. 3 device using moving picture characters will be described in more detail with reference to FIGS. 4A through 6.

Figure 4A:
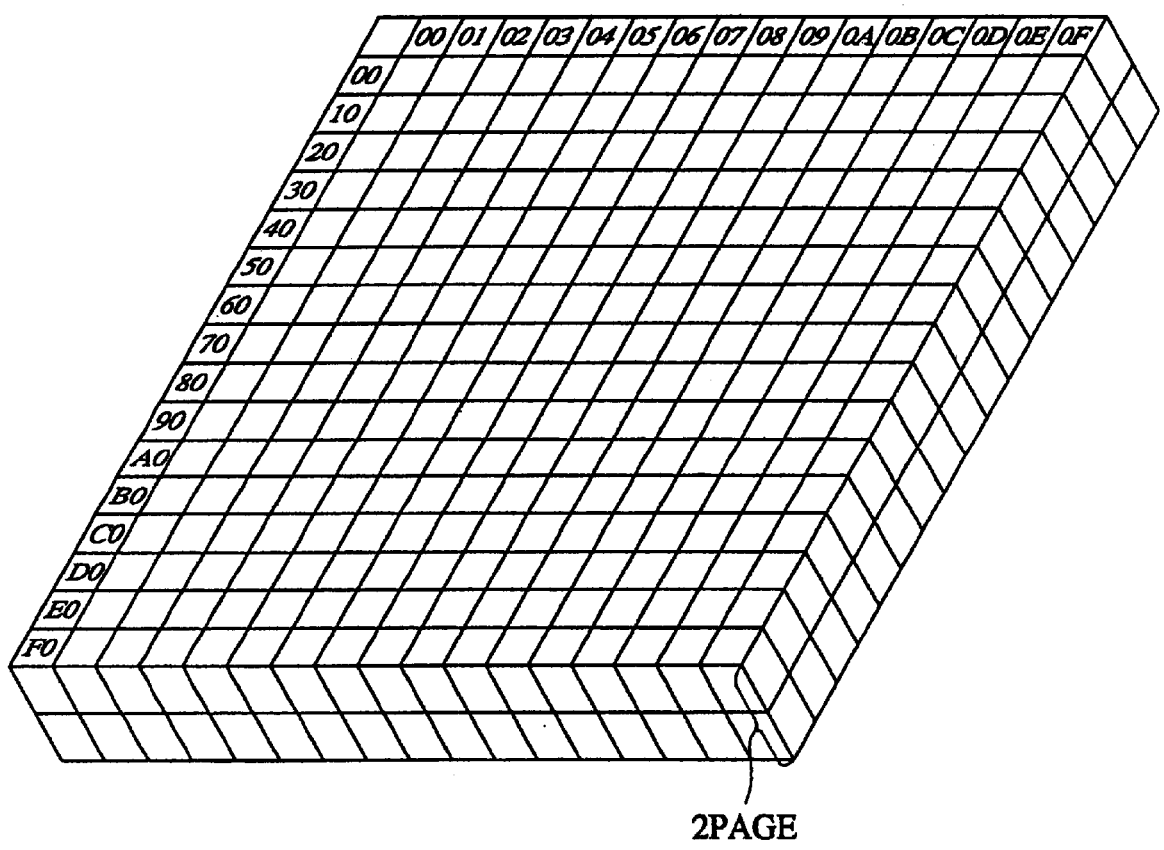
FIG. 4A shows the structure of the VRAM of FIG. 3.
Figure 4B:
FIG. 4B shows a picture containing a character shape to be displayed.
Figure 4C:
FIG. 4C shows a divided state of the FIG. 4B picture.
Figures 4D, 4E:
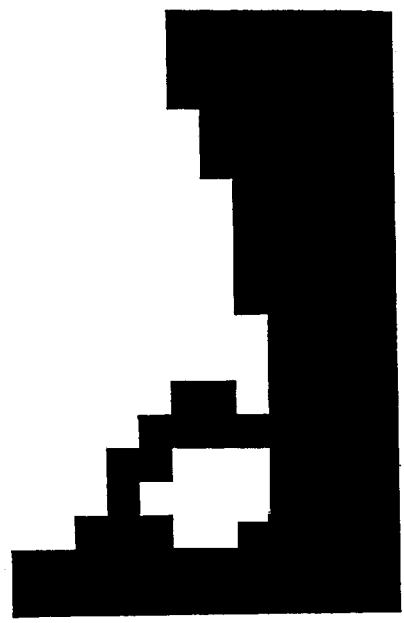
FIG. 4D shows the structure of the VRAM storing each font of the divided picture of FIG. 4C.
FIG. 4E is an enlarged view of a portion of FIG. 4D.

FIGS. 4A through 4E are views for explaining examples of the operation state indication according to the present invention. FIG. 4A shows the structure of the VRAM 33 of FIG. 3, FIG. 4B shows a picture containing a character shape to be displayed, FIG. 4C shows a divided state of a portion of the FIG. 4B picture, FIG. 4D shows the structure of the VRAM 33 storing each font of the divided picture of FIG. 4C, and FIG. 4E is an enlarged view of a portion of FIG. 4D.

The VRAM 33 in the embodiment of the present invention includes two pages as shown in FIG. 4A. The numbers or alphanumeric characters are stored in one page as in the VRAM shown in FIG. 1, and the pictures shown in FIG. 4B are stored in the other page. Otherwise, the pictures can be stored in both pages of the VRAM 33. When a picture is stored in the VRAM 33, the picture of FIG. 4B is divided into blocks each having a predetermined magnitude, as shown in FIG. 4C, and the divided blocks are assigned to respective address positions to be stored as shown in FIG. 4D. Here, the blocks assigned to each address position in the VRAM 33 are defined as fonts. When several pictures are stored, only fonts corresponding to a difference portion between the pictures are stored and thereafter fonts are combined as pieces to form a picture.

In FIG. 3, if one of various functions in a corresponding set is selected through a key inputter 31 such as a remote controller 311 or a key matrix 312, the microcontroller 32 receives the selected key input and is interrupted, to thereby stop a currently proceeding operation and perform the operation of the selected function. That is, if a user inputs a stop key input through the key inputter 31 at the state where the VCR is in a play state in which the contents recorded on a tape loaded into the set is played, the microcontroller 32 controls the driving of the servo unit 36 to stop rotation of the capstan motor and the drum motor. If the capstan motor and the drum motor have stopped, the tape running and the video head rotation stop, to thereby stop a reproduction operation.

The microcontroller 32 executes the programs stored in the ROM 322 in sequence under the control of the RAM 321 and displays the current operation state on the display. That is, the microcontroller 32 judges the operation state from the key input and reads fonts forming predetermined pictures in correspondence to the judged operation state from the VRAM 33. The microcontroller 32 combines the read fonts to form a picture and displays the formed picture on the display 34 to indicate the operation state. For example, if a device indicates a "stop state" as a puppy character as shown in FIGS. 5A through 5D with four pictures containing situations that the puppy runs and stops, the microcontroller 32 reads the corresponding fonts stored in the VRAM 33, forms the picture of FIG. 5A, and then displays the formed picture on the display. Then, the microcontroller 32 changes only selected ones of the fonts, forms the picture of FIG. 5B, and then displays the formed picture on the display for a predetermined period of time, to thereby enable the puppy to appear to move. Here, the changed fonts refer to fonts containing a difference between the currently displayed picture and a next picture to be displayed. The operation state indication will be described in more detail with reference to FIG. 6.

Figure 6:
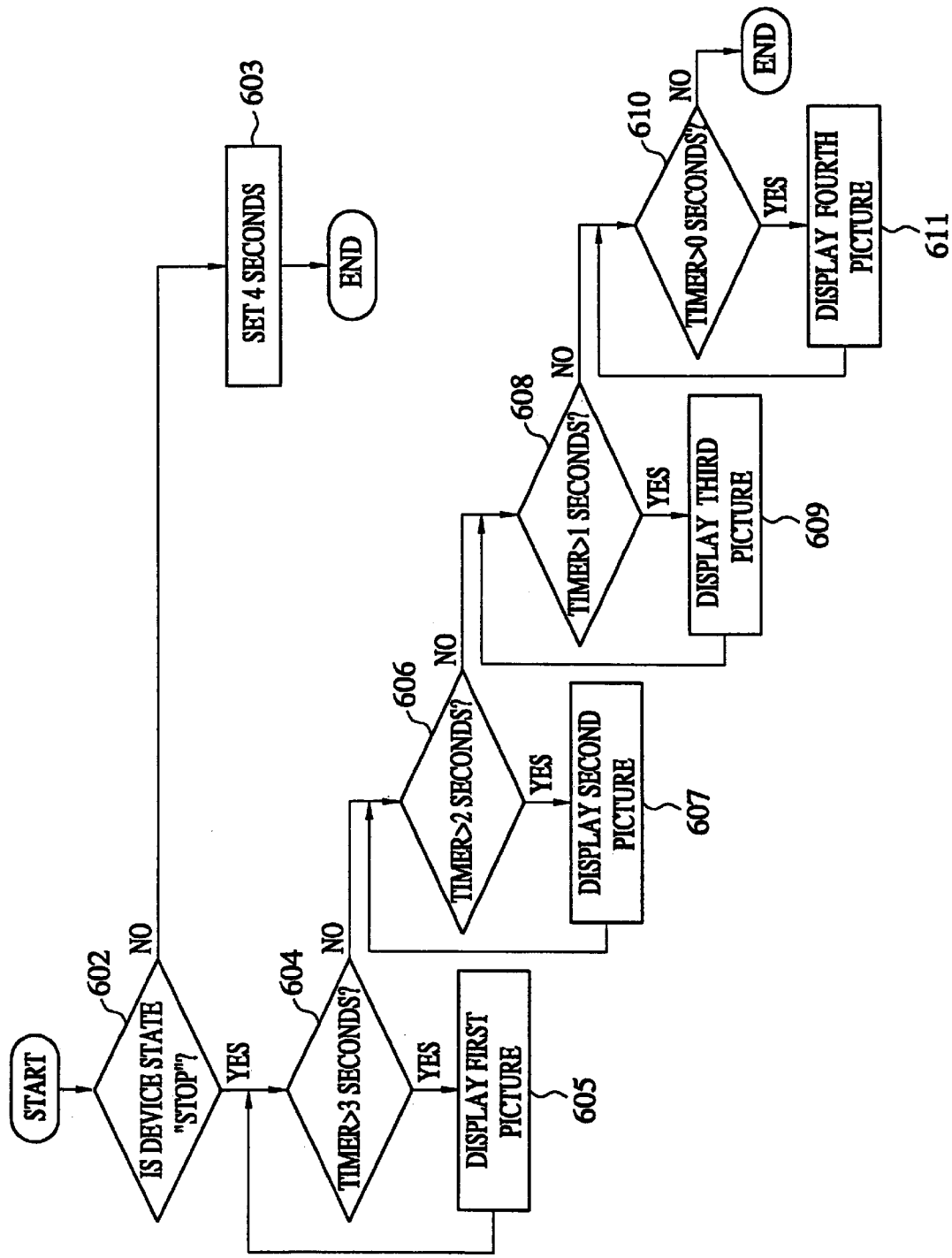
FIG. 6 is a flow-chart view for explaining a moving picture character display process of the FIG. 3 apparatus.

FIG. 6 is a flow-chart view for explaining a moving picture character display process of the FIG. 3 apparatus. Referring to FIG. 3 and FIG. 6, the microcontroller 32 (FIG. 3) judges an operation state according to a key input (602), at a state where respective fonts have been stored in the VRAM 33. Here, the case of judging a "stop state" will be exemplified. That is, in the case that a current state is shifted to a stop state, the microcontroller 32 sends out a stop command to the servo unit 36 (FIG. 3) and controls an operation displaying the stop state.

However, in the case that a current state is shifted from the stop state to another state such as a play (PLAY) or a record (REC) state, the microcontroller 32 controls the driving of the servo unit 36 continuously. Also, the microcontroller 32 sends out an additional control signal during the controlling of the servo unit 36 to control an operation of indicating that the current state is a state such as a PLAY or REC state. If a current state is not a stop state in the judging at 602, the microcontroller 32 sets a timer (not shown) of the RAM 321 for a predetermined time, for example, four seconds, according to programs stored in the ROM 322 (603).

If a current state is a stop state in the judging at 602, the microcontroller 32 sends out a stop command to the servo unit 36 and checks if the time set in the timer remains more than three seconds (604). As the current state is judged as the stop state, the time set in the timer is reduced. The servo unit 36 stops rotation of the capstan motor and the drum motor according to the stop command of the microcontroller 32.

Figure 5A:
FIGS. 5A through 5D show display states illustrating moving picture display examples each containing a character shape corresponding to an electronic device state according to the present invention.

If the time remains more than three seconds in the checking at 604, the microcontroller 32 reads the fonts stored in the VRAM 33 according to the programs stored in the ROM 322, forms a first picture shown in FIG. 5A, displays the first picture on the display 34 (605), and returns to repeat the checking at 604 If more than three seconds of time does not remain in the checking at 604, the microcontroller 32 checks whether the timer set time remains more than two seconds (606).

Figure 5B:

If more than two seconds of time does not remain in the checking at 606, the microcontroller 32 reads only the font corresponding to the portion having changed from the first picture from the VRAM 33, forms a second picture shown in FIG. 5B, displays the formed second picture on the display 34 (607), and returns to repeat the checking at 606. If more than two seconds of time does not remain in the checking at 606, the microcontroller 32 checks whether the timer set time remains more than one second (608).

Figure 5C:
Figure 5D:

If more than one second of time remains in the checking at 608, the microcontroller 32 reads only the font corresponding to the portion to be changed from the second picture from the VRAM 33, forms a third picture shown in FIG. 5C, displays the formed third picture on the display 34 (609), and returns to the checking at 608, to thereby repeat the checking at 608. If more than one second of time does not remain in the checking at 608, the microcontroller 32 checks whether the timer set time remains more than zero (610). If more than zero time remains in the checking at 610, the microcontroller 32 reads only the font corresponding to the portion to be changed from the third picture from the VRAM 33, forms a fourth picture shown in FIG. 5D, displays the formed fourth picture on the display 34 (611), and returns to repeat the checking at 610.

That is, the first through fourth pictures are displayed one each second on the display 34 in sequence for four seconds set in the timer during stop of rotation of the capstan motor and the drum motor according to the stop command of the microcontroller 32. As a result, a moving character is displayed as a moving picture containing character run and stop shapes. Accordingly, the user sees the current operation state is a stop state more familiarly. The microcontroller 32 erases the picture displayed on the display and completes the operation where the timer time becomes zero.

In another example, if a "play" key is depressed at the state where the VCR has stopped, the microcontroller 32 judges the key input and controls the driving of the servo unit 36. The servo unit 36 is driven under the control of the microcontroller 32 to thereby control phases and speeds of the capstan motor and the drum motor, in order to reproduce the contents recorded on tape via a head or heads. While the servo unit 36 controls phases and speeds of the capstan motor and the drum motor, the microcontroller 32 sends out an additional control signal, reads fonts corresponding to a "play" state among the fonts stored in the VRAM 33 and displays the read font on the display 34.

Meanwhile, in addition to indicating the operation state as a moving picture of a character shape, the microcomputer 32 also outputs a sound matching the moving picture. For example, where the moving picture is a puppy character, a "bow wow" sound matching the puppy character is output, to thereby enable the user to feel more familiarity. For this purpose, the microcontroller 32 applies a pulse, according to frequency and time corresponding to a sound programmed in the ROM 322 in correspondence to the picture according to the operation state, to the base electrode of the transistor (TR) of the sound generator 35 via a timer port 323.

The transistor (TR) is driven by the pulse applied to the base electrode thereof, to actuate the buzzer 351 connected to the collector of the transistor (TR). Here, as the frequency is varied, a ring sound is varied, to create for example, a puppy sound. The operation of the sound generator 35 will be described in more detail referring to FIGS. 7 and 8. The microcontroller 32 judges whether a current time is a sound generation start point in time along a buzzer routine (701). The sound generation start point in time means a point in time when an operation state is indicated for a user upon an input of a user key manipulation.

If the sound generation start point in time is determined in the judging at 701, the microcontroller 32 sets frequency and time corresponding to a predetermined sound in correspondence to the judged operation state and makes the sound generator 35 ring with the frequency sound set in the sound generator 35 for the set time. That is, pictures or sounds to be indicated according to each operation state are programmed in the ROM 322 of the microcontroller 32 as shown in FIG. 8. Here, it is assumed that the fast forward (FF) state of the device corresponds to a predetermined high-pitched tone of "Do-Re-Mi" sound. The microcontroller 32 sets a first sound having a frequency corresponding to "Do" of a high-pitched tone (703) and then sets a generation time of the first sound (704). The sound generator 35 rings with the sound corresponding to the set frequency for the set time.

The microcontroller 32 checks whether the time set in the incorporated timer exceeds the set time (704), and if the former exceeds the latter, the microcontroller 32 sets a second sound having a frequency corresponding to "Re" of a high-pitched tone (705). After setting the frequency, the microcontroller 32 sets time (706) and makes the sound generator 35 ring with a sound corresponding to the set frequency for the set time. Then, the microcontroller 32 checks whether the time set in the timer exceeds the set time (707), and if the former exceeds the latter, the microcontroller 32 sets a third sound having a frequency corresponding to "Mi" of a high-pitched tone (708). After setting the frequency, the microcontroller 32 sets time (709) and makes the sound generator 35 ring with a sound corresponding to the set frequency for the set time. Then, the microcontroller 32 checks whether the time set in the timer exceeds the set time (710), and if the former exceeds the latter, checks whether a buzzer operation has completed (711). If the buzzer operation has completed in the result of checking in 711, the operation ends and if the buzzer operation has not completed, the program returns to 702 to repeat the operations 702 through 711.

Figure 8E:
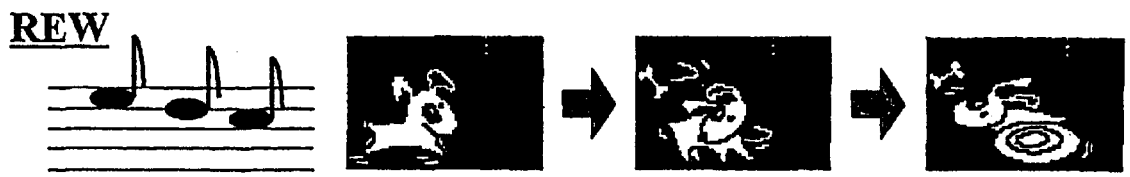

The features shown in FIGS. 8A through 8H for indicating the operational state of the VCR are more specifically described as follows. In FIG. 8A, a picture-sound sequence for POWER is indicated by a first picture sequence showing a puppy recognizing the existence of a bone and sounding a first musical note two times, followed by sounding the first musical note two additional times.

In FIG. 8B, a picture-sound sequence for PLAY is indicated by a second picture sequence showing the puppy chasing the bone, which appears to elude the puppy, and sounding a second musical note twice.

In FIG. 8C, a picture-sound sequence for STOP is indicated by a third picture sequence showing the puppy stopping without catching the bone and sounding a third musical note twice.

In FIG. 8D, a picture-sound sequence for fast forward (FF) is indicated by a fourth picture sequence showing the puppy more rapidly chasing the bone, which again appears to elude the puppy, and sounding the first, second and third musical notes in sequence.

In FIG. 8E, a picture-sound sequence for rewind (REW) is indicated by a fifth picture sequence showing the puppy chasing the bone in a direction opposite the fourth (FF) picture sequence and sounding the third, second and first musical notes in sequence.

Figure 8F:

In FIG. 8F, a picture sound sequence for record (REC) is indicated by a sixth picture sequence showing the puppy carrying the bone and sounding the third musical note once and for a longer duration than the sounding of the third musical note for STOP.

Figure 8G:
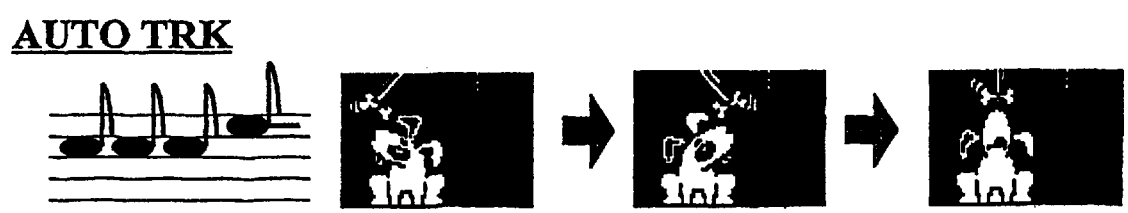

In FIG. 8G, a picture sound sequence for auto track (AUTO TRK) is indicated by a seventh picture sequence showing the puppy watch as the bone passes over the puppy's head and finally coming to rest over the puppy's nose as the puppy looks up and sounding the first musical note three times followed by sounding the third musical note once.

Figure 8H:

In FIG. 8H, a picture sound sequence for eject (EJECT) is indicated by the puppy dropping the bone and sounding the first musical note once followed by sounding the third musical note twice.

As described above, the operation state indication method and apparatus according to the present invention indicates a current state as a moving picture of various shapes of an associated character, to thereby enable a user to see the current operation state more easily and feel more familiarity, in comparison with a conventional case that a current state of an electronic device such as TVs and VCRs is displayed as OSD characters. In addition, the operation state indication method and apparatus plays a role of a toy for children who do not read characters, to thereby extend the use of the electronic device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of indicating an operating state of an electronic device on a visual display, the method comprising:

judging an operation state of the device;

selecting a first group of a plurality of pre-stored fonts and at least one other of the plurality of pre-stored fonts according to the judged operation state;

arranging the selected fonts to display a first picture on the visual display; and replacing the at least one other font with another of the plurality of fonts to display a second picture on said visual display, the second picture differing from said first picture, wherein:
the arranging and replacing occur at time intervals to result in a moving picture,
each displayed picture is an association between an animate object and an inanimate object, and
both the animate object and the inanimate object appear to move.

2. The method of claim 1, further comprising associating a sound sequence with the arranging and the replacing of the first and second pictures.

3. The method of claim 2, wherein the sound sequence comprises at least one musical note selected from the group consisting of musical notes Do, Re and Mi.

4. The method of claim 2, wherein the sound sequence comprises a sound customarily associated with the animate object.

5. An apparatus for indicating an operating state of an electronic device on a visual display, the apparatus comprising:

a memory which stores a plurality of fonts corresponding to respective portions of a picture; and a microprocessor which:
judges an operation state of the device;
selects a first group of the plurality of fonts and at least one other of the plurality of fonts according to the judged operation state;
arranges the selected fonts to display a first picture on the visual display; and
replaces the at least one other of the plurality of fonts with another of the plurality of fonts to display a second picture on said visual display, the second picture differing from said first picture, wherein:
the microprocessor arranges and replaces the fonts at time intervals to result in a moving picture,
each displayed picture is an association between an animate object and an inanimate object, and
the microprocessor arranges and replaces the fonts at time intervals such that both the animate object and the inanimate object appear to move.

6. The apparatus of claim 5, wherein the microprocessor further associates a sound sequence with the first and second pictures.

7. The apparatus of claim 6, wherein the sound sequence comprises at least one musical note selected from the group consisting of musical notes Do, Re and Mi.

8. The method of claim 6, wherein the sound sequence comprises a sound customarily associated with the animate object.

* * * * *